United States Patent
Kim et al.

(10) Patent No.: US 8,243,781 B2
(45) Date of Patent: Aug. 14, 2012

(54) APPARATUS AND METHOD FOR SIGNAL QUALITY MEASUREMENT ON GFSK SIGNALS

(75) Inventors: Pansop Kim, Torrance, CA (US); Jeng-Hong Chen, Temple City, CA (US); Hsin-Hsiang Liu, Torrance, CA (US)

(73) Assignee: ISSC Technologies Corp., Hsinchu (TW)

( * ) Notice: Subject to any disclaimer, the term of this patent is extended or adjusted under 35 U.S.C. 154(b) by 423 days.

(21) Appl. No.: 12/581,418

(22) Filed: Oct. 19, 2009

(65) Prior Publication Data
US 2011/0090944 A1    Apr. 21, 2011

(51) Int. Cl.
*H04B 17/00* (2006.01)
*H04L 27/14* (2006.01)

(52) U.S. Cl. .......................... 375/227; 375/334
(58) Field of Classification Search ................ 375/272, 375/278, 334; 329/300
See application file for complete search history.

(56) References Cited

U.S. PATENT DOCUMENTS

| | | | |
|---|---|---|---|
| 4,393,499 A * | 7/1983 | Evans | 714/704 |
| 7,239,675 B2 * | 7/2007 | Zehavi et al. | 375/334 |
| 7,245,672 B2 | 7/2007 | Smit | |
| 7,397,871 B2 | 7/2008 | Wiss et al. | |
| 7,415,078 B2 | 8/2008 | Smit | |
| 2003/0002600 A1 * | 1/2003 | Twu et al. | 375/334 |
| 2007/0223393 A1 | 9/2007 | Urushihara et al. | |
| 2011/0142173 A1 * | 6/2011 | Peng et al. | 375/334 |

* cited by examiner

*Primary Examiner* — Khanh C Tran
(74) *Attorney, Agent, or Firm* — Birch, Stewart, Kolasch & Birch, LLP

(57) ABSTRACT

The present invention discloses an effective apparatus and method to measure the received signal quality for a GFSK modulated signal with (or without) an unknown modulation index. The signal quality measurements are based on the decoded (unknown or known) bits and the trellis of the frequency discriminator output. This trellis is pre-calibrated with a reference Rx. The transmitted modulation index is also accurately estimated in this invention.

13 Claims, 4 Drawing Sheets

APPARATUS AND METHOD FOR SIGNAL QUALITY MEASUREMENT ON GFSK SIGNALS

BACKGROUND OF THE INVENTION

1. Field of the Invention

The present invention generally relates to digital communication systems, and more particularly to methods for signal quality measurements on Gaussian frequency shift keying (GFSK) signals.

2. Description of the Related Art

For communication systems, received signal quality measurements are important for several reasons. One of the reasons is the production line testing (PLT). PLT is required to determine whether every component in a transmitter (Tx) and a receiver (Rx) works correctly. In order for PLT to be passed and product shipped, all the measured signal qualities must meet the product specifications. Another reason is that this measured signal quality may be used for an indicator of the current physical channel condition including the Tx and the Rx distortions. This signal quality measured may be widely utilized. For example, by measuring the signal quality, the supported data rates for a current wireless channel can be easily accessed and adjusted. Or, Tx power can be controlled by this signal quality measured. This signal quality may be also utilized for packet loss concealment with sound transmitted. Not only lost packets but also bad packets with errors may be replaced for a better sound quality.

Received signal-to-noise ratio (SNR) is one of the possible indicators for decoded signal qualities. However, received SNR alone may not be a valid signal quality indicator, especially for wireless systems, as interference may also affect the signal quality. That is why signal to interference-plus-noise ratio (SINR) may be a better indicator for wireless systems. Unfortunately, it is not simple to calculate the received SNR or SINR because the received signal is a combination of a signal, an interference and a noise. The signal, the interference and the noise are hard to separate since they are unknown until the information bits are decoded correctly at the Rx. Because of this difficulty, sometimes SNR (or SINR) is approximated by the error vector magnitude (EVM). The EVM is the average distance between the received signal and the closest constellation points. It is much simpler to measure the EVM because closest constellation points can be instantly determined with simple operations. The EVM and SNR (or SINR) are not identical, but closely related. That is, the EVM is also a good indicator for decoded signal qualities.

Bluetooth [Specification of the Bluetooth System, 2.0+ EDR, 4 Nov. 2004] defines differential EVM (DEVM) for enhanced data rates which adopt differential phase-shift keying (DPSK) as a modulation scheme. However, the EVM is hard to derive from modulations like Gaussian frequency shift keying (GFSK) because of its non-linearity property. Moreover, the Bluetooth GFSK signals may have different modulation index h varying from 0.28 to 0.35. Here, an efficient method to measure the signal quality of a GFSK signal with varying h is proposed.

BRIEF SUMMARY OF THE INVENTION

Signal quality measurement like EVM in the Rx is quite popular for wireless communication systems. This signal quality measured may be used for many applications including product line testing and transmit power/rate control. However, EVM-like measurement is hard to calculate for some modulation schemes like GFSK. EVM-like measurement is even harder for Bluetooth GFSK signals because the modulation index is unknown to the Rx. The primary objective of the present invention is to provide a method for signal quality measurement on GFSK signals, which measures the received signal quality for a GFSK signal. To measure the signal quality of a GFSK signal with a varying modulation index, decoded bits and a simple 3-bit trellis of the frequency discriminator output are utilized. The trellis is pre-calibrated with a reference Rx. The modulation index can also be accurately estimated with this invention. Furthermore, the other primary objective of the present invention is to provide an apparatus for signal quality measurement on GFSK signals.

We propose two methods and corresponding apparatus for measuring GFSK signal quality based on pre-calibrated trellis. One is to measure the receive power and the noise power on frequency deviation values and to calculate SNR as a quality indicator. Given the plurality of decoded bits and a pre-calibrated trellis, one can measure the instant noise power on the current extracted frequency deviation value by comparing it with the pre-calibrated trellis. This instant noise power becomes accurate with averaging over samples. Reliable receive power can be also calculated by averaging the instant receive power over samples. With these two values, the receive power and the noise power, signal quality can be calculated. The other is a method to calculate the variance of the normalized frequency deviations. Frequency deviation values can be normalized with the plurality of decoded bits and pre-calibrated trellis. Then, normalized frequency deviation values may have a quite constant value without distortion or significant noise. By measuring the variance of the normalized frequency deviations, we can measure the signal quality.

To achieve the above objective, the present invention provides an apparatus for signal quality measurement on GFSK signal comprises a plurality of binary information bits; a received RF signal; a frequency discriminator; a decoder and a signal quality measurement. The plurality of binary information bits is modulated and sent with an analog output to a channel. The received RF signal from the channel is processed through a Rx RF unit combined with a filter to obtain a filtered value. The frequency discriminator is used for extracting a frequency deviation information from the filtered value. The decoder is used for sampling the frequency deviation information at the correct timing to decode and generate a plurality of decoded bits. The signal quality measurement as a pre-calibrated measurement is used for measuring a signal quality of the plurality of decoded bits.

According to one aspect of the present invention, the signal quality measurement comprises: a frequency deviation information; a plurality of decoded bits; a plurality of averaging over samples units and a subtraction and division unit. The frequency deviation information is used for measuring a receive power and a noise power. The plurality of decoded bits is used for measuring the noise power on the current frequency deviation information by comparing with a plurality of pre-calibrated trellis. The plurality of averaging over samples units is used for making the receive power and the noise power become accurate and reliable. The subtraction and division unit is used for calculating a ratio of the receive power and the noise power as a quality indicator to obtain a signal quality.

To achieve the above another objective, the present invention provides a method for signal quality measurement on GFSK signals, comprising the steps of: modulating and sending a plurality of binary information bits with an analog output to a channel; processing a received RF signal from the channel through a Rx RF unit combined with a filter to obtain a filtered value; using a frequency discriminator to extract a frequency deviation information from the filtered value; using a decoder to sample the frequency deviation information at the correct timing to decode and to generate a plurality of decoded bits; and using a signal quality measurement as a pre-calibrated measurement to measure a signal quality of the plurality of decoded bits.

According to one aspect of the present invention, the signal quality measurement comprising the steps of: using a frequency deviation information to measure a receive power and a noise power; using a plurality of decoded bits to measure the noise power on the current frequency deviation information by comparing with a plurality of pre-calibrated trellis; making the receive power and the noise power become accurate and reliable by using a plurality of averaging over samples units; and calculating a ratio of the receive power and the noise power as a quality indicator to obtain a signal quality by using a subtraction and division unit.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Bluetooth is a wireless protocol for personal area networks. In the radio specification of the Bluetooth standard, the Basic Data Rate (BDR) uses GFSK as modulation type. The bandwidth period product used is 0.5 (BT=0.5), and the modulation index h shall be between 0.28 and 0.35. For a GFSK modulation, one symbol represents one bit, and a binary one shall be represented by a GFSK waveform with positive frequency deviation. And a binary 0 is represented by a GFSK waveform with negative frequency deviation.

Figure 1:
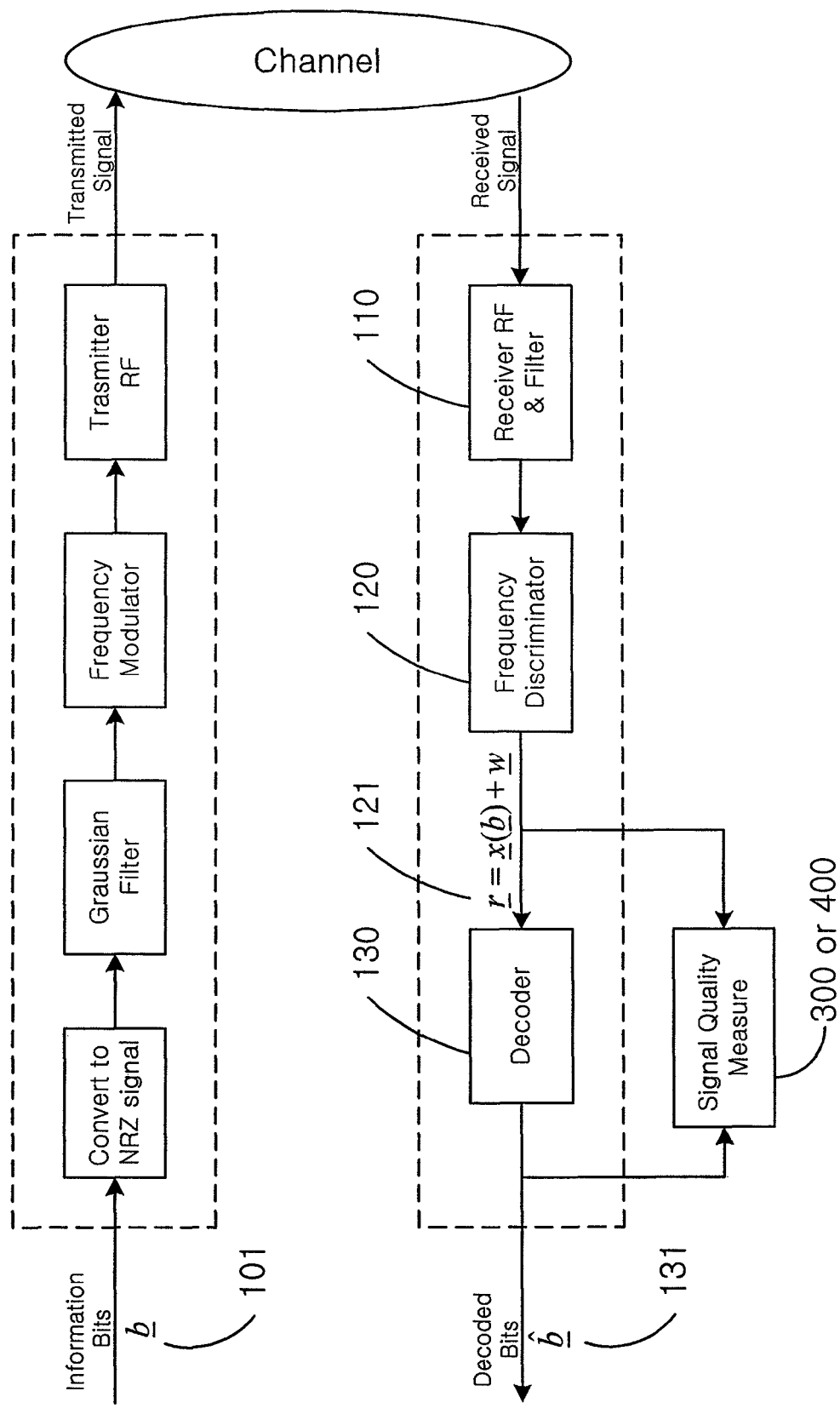
FIG. 1 shows a typical GFSK Tx and a conventional Rx with a signal quality measurement unit according to the present invention.

Referring to FIG. 1, it shows a diagram for a typical GFSK Tx and a conventional Rx with a signal quality measurement 300, 400. The present invention provides an apparatus for signal quality measurement on GFSK signal comprises a plurality of binary information bits 101 $\{b_n\}$; a received RF signal; a frequency discriminator 120; a decoder 130 and a signal quality measurement 300, 400. The plurality of binary information bits 101 $\{b_n\}$ is modulated and sent with an analog output to a channel. The received RF signal from the channel is processed through a Rx RF unit combined with a filter 110 to obtain a filtered value. The frequency discriminator 120 is used for extracting a frequency deviation information 121 from the filtered value. The decoder 130 is used for sampling the frequency deviation information 121 at the correct timing to decode and generate a plurality of decoded bits 131. The signal quality measurement 300, 400 as a pre-calibrated measurement is used for measuring a signal quality of the plurality of decoded bits 131. In the Tx, the plurality of binary information bits 101 $\{b_n\}$ are first converted to a non-return-to-zero signal before passing through a Gaussian filter and the frequency modulator. This frequency modulated signal is sent to Tx Radio Frequency (RF) units with its analog output sent to the channel. The channel can be either an air channel or a cable channel. After a received RF signal is processed through a Rx RF unit combined with a filter 110 to obtain a filtered value, a frequency deviation information 121 is extracted by a frequency discriminator 120. A decoder 130, by sampling the frequency deviation information 121 at the correct timing, decodes and generates a plurality of decoded bits 131 $\{\hat{b}_n\}$. The signal quality measurement 300, 400 measures the signal quality with the frequency deviation information 121 and the plurality of decoded bits 131 $\{\hat{b}_n\}$. In one word, the present invention provides a method for signal quality measurement 300, 400 on GFSK signals, comprising the steps of: modulating and sending a plurality of binary information bits 101 with an analog output to a channel; processing a received RF signal from the channel through a Rx RF unit combined with a filter 110 to obtain a filtered value; using a frequency discriminator 120 to extract a frequency deviation information 121 from the filtered value; using a decoder 130 to sample the frequency deviation information 121 at the correct timing to decode and to generate a plurality of decoded bits 131; and using a signal quality measurement 300, 400 as a pre-calibrated measurement to measure a signal quality of the plurality of decoded bits 131.

Let the plurality of information bits 101 b be an N×1 vector which has information bits as elements:

$$b=[b_0 b_1 \ldots b_n \ldots b_{N-1}]^T, \text{where } b_n \in \{0,1\} \text{ and n is a time index.}$$

Also let r be an N×1 vector having the frequency deviation information 121 at the correct timing as elements:

$$r=[r_0 r_1 \ldots r_n \ldots r_{N-1}]^T.$$

Note that the numbers of information bits 101 and the frequency deviation information 121 may be different due to the preamble. Here, the preamble bits are considered part of the information bits for convenience. For the preamble, decoded bits may be replaced by known bits.

Then, r can be represented as following:

$$r=x(b)+w,$$

Where the N×1 vector $x(b)=[x_0 x_1 \ldots x_{N-1}]^T$ represents the signals without any noise added, but including every filtering such as the filters in the Tx and the reference Rx including the Gaussian filter and the Rx RF unit combined with a filter 110. For BT applications, one may ignore the filtering effects in the channel for x(b) because the air/cable channel is quite frequency non-selective due to the low symbol rate and the relatively small distance between the Tx and the Rx. The N×1 vector w represents the distortion caused by the channel (and possibly RX, or Tx/Rx mal-functions). Note that the power ratio of x(b) and w are not equivalent to the received SNR or SINR because this ratio is computed based on frequency deviation. However, this ratio is also a signal quality indicator, which directly impact the decoded bit error rate (BER) at a BT Rx.

Due to the Gaussian filter and the Rx RF unit combined with a filter 110, $x_n$ is not only a function of the plurality of decoded bits 131 $b_n$, but also a function of information bits 101 b. It is observed that for most Bluteooth systems, $x_n$ is approximately only a function of the plurality of decoded bits 131 [$b_{n-1}$ $b_n$ $b_{n+1}$]. In other words, $x_n$ is determined by the previous, the current and the next information bits. Now referring to FIG. 2, it illustrates a typical trellis of the frequency discriminator 120 output. With correct timings, $x_n$ has approximately six values as shown in Table 1.

TABLE 1

| ($b_{n-1}$ $b_n$ $b_{n+1}$) | $x_n$/h |
|---|---|
| (1, 1, 1) | γ |
| (1, 1, 0) | β |
| (0, 1, 1) | β |
| (0, 1, 0) | α |
| (1, 0, 1) | -α |
| (1, 0, 0) | -β |
| (0, 0, 1) | -β |
| (0, 0, 0) | -γ |

Figure 3:
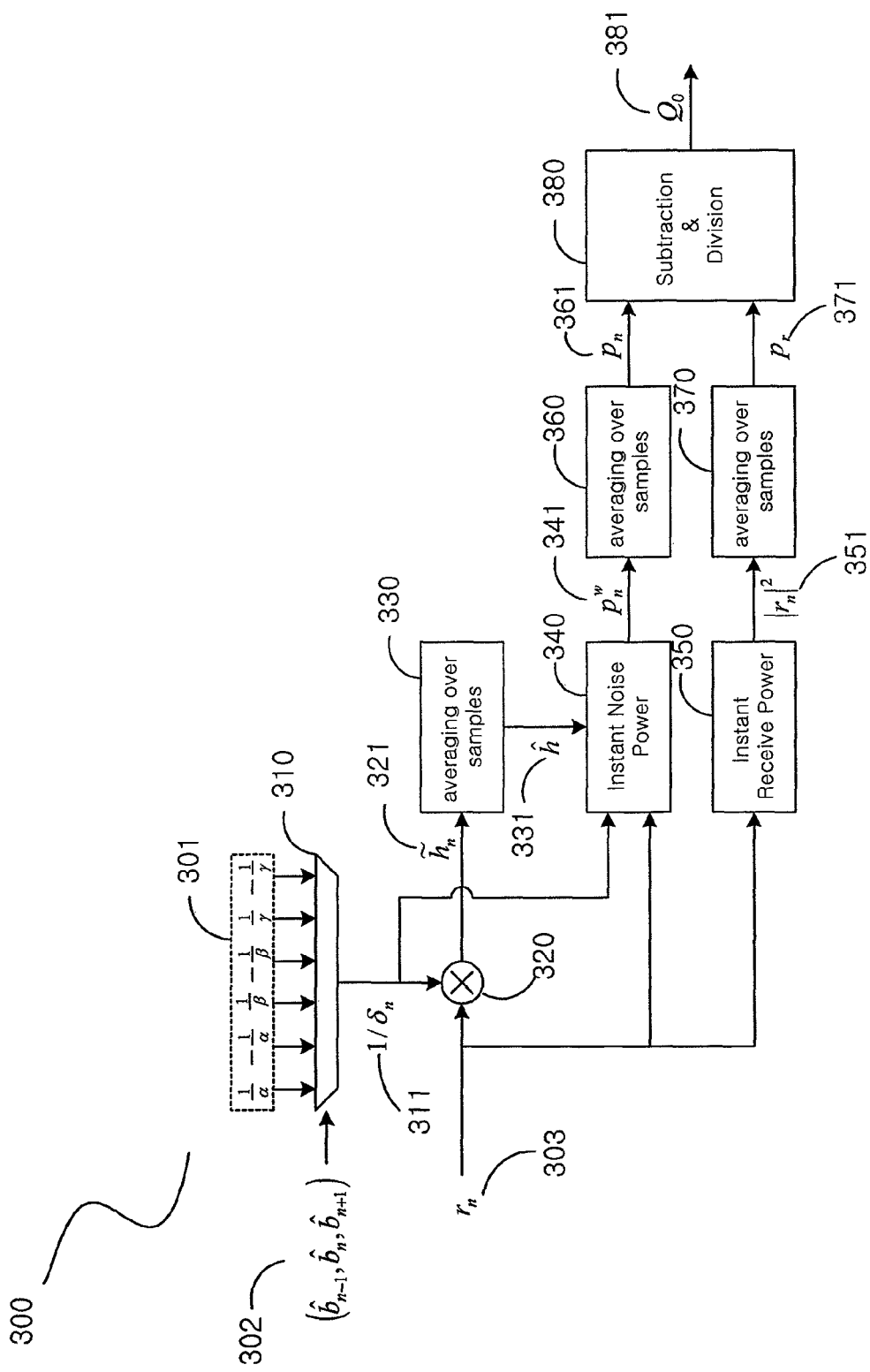
FIG. 3 shows an example of signal quality measurement implementation according to the present invention.

We show two methods for measuring GFSK signal quality based on pre-calibrated trellis. Referring to FIG. 3, an algorithm of a method for signal quality measurement 300 comprises a frequency deviation information 303; a plurality of decoded bits 302; a plurality of averaging over samples units 330, 360, 370 and a subtraction and division unit 380. The frequency deviation information 303 is used for measuring a receive power 350 and a noise power 340. The plurality of decoded bits 302 is used for measuring the noise power 340 on the current frequency deviation information 303 by comparing with a plurality of pre-calibrated trellis 301. The plurality of averaging over samples units 330, 360, 370 is used for making the receive power 350 and the noise power 340 become accurate and reliable. The subtraction and division unit 380 is used for calculating a ratio of the receive power 350 and the noise power 340 as a quality indicator to obtain a signal quality 381. In one word, it is to measure the receive power 350 and noise power 340 on the frequency deviation information 303 and to calculate SNR as a quality indicator. Given the plurality of decoded bits 302 [$\hat{b}_{n-1}$, $\hat{b}_n$, $\hat{b}_{n+1}$] (the previous bit $\hat{b}_{n-1}$, the current bit $\hat{b}_n$, and the next bit $\hat{b}_{n+1}$), one can measure the instant noise power 340 on the current extracted the frequency deviation information 303 by comparing it with the pre-calibrated trellis. This instant noise power 340 becomes more accurate with averaging it over samples. Reliable receive power 350 can be also calculated by averaging the instant receive power over samples. With these two values, receive power 350 and noise power 340, signal quality 381 can be calculated.

The signal quality measurement 300 comprising the steps of: using a frequency deviation information 303 to measure a receive power 350 and a noise power 340; using a plurality of decoded bits 302 to measure the noise power 340 on the current frequency deviation information 303 by comparing with a plurality of pre-calibrated trellis 301; making the receive power 350 and the noise power 340 become accurate and reliable by using a plurality of averaging over samples units 330, 360, 370; and calculating a ratio of the receive power 350 and the noise power 340 as a quality indicator to obtain a signal quality 381 by using a subtraction and division unit 380.

The detail method for signal quality measurement 300 on GFSK signals is as follows:

step 1: pre-calibrating with a reference Rx to obtain a plurality of values 1/α, 1/β and 1/γ 301 according to decoded bits 302 [$\hat{b}_{n-1}$, $\hat{b}_n$, $\hat{b}_{n+1}$] and the plurality of binary information bits 101;

Step 2: obtaining a plurality of decoded bits 302 [$\hat{b}_{n-1}$, $\hat{b}_n$, $\hat{b}_{n+1}$] from a decoder 130 of the reference Rx;

Step 3: selecting a value 311 1/$\delta_n$ in a multiplexer 310 among the plurality of values ±1/α, ±1/β and ±1/γ 301, according to the plurality of decoded bits 302 [$\hat{b}_{n-1}$, $\hat{b}_n$, $\hat{b}_{n+1}$] and Table 2;

Step 4: obtaining a frequency deviation information 303 $r_n$ from a frequency discriminator 120 of the reference Rx;

Step 5: multiplying the frequency deviation information 303 $r_n$ by the value 311 1/$\delta_n$ in a multiplier 320 to generate a modulation index estimate 321 $\tilde{h}_n$;

Step 6: averaging modulation index estimate 321 $\tilde{h}_n$ over samples to obtain a more accurate modulation index estimate 331 $\hat{h}$;

Step 7: estimating instant noise power 341 $p_n^w$ by $p_n^w = (r_n - \delta_n \cdot \hat{h})^2$;

Step 8: averaging the instant noise power 341 $p_n^w$ over samples to obtain a more accurate noise power estimate 361 $p_n$;

Step 9: averaging $|r_n|^2$ 351 over samples to calculate a receive power estimate 371 $p_r$; and Step 10: estimating a signal quality 381 $Q_0$ by $Q_0 = (p_r - p_n)/p_n$.

Note the values α, β and γ depend on the reference Rx. Those values α, β and γ are pre-calibrated with the reference Rx by simulations and/or calculations. Additionally, the plurality of pre-calibrated trellis 301 are pre-calibrated by measurements, computer simulations and/or calculations. The plurality of pre-calibrated trellis 301 are also related to the plurality of decoded bits 302 and the plurality of binary information bits 101. Note that $x_n$ may be a function of more than three bits, so it may have more than six values.

Given the plurality of decoded bits 302 [$\hat{b}_{n-1}$, $\hat{b}_n$, $\hat{b}_{n+1}$], one can first use Table 2 to determine the value $\delta_n$, and then compute an instant modulation index estimate 321 $\tilde{h}_n$ as follows:

$$\tilde{h}_n = r_n/\delta_n.$$

TABLE 2

| ($\hat{b}_{n-1}$ $\hat{b}_n$ $\hat{b}_{n+1}$) | $\delta_n$ |
|---|---|
| (1, 1, 1) | γ |
| (1, 1, 0) | β |
| (0, 1, 1) | β |
| (0, 1, 0) | α |
| (1, 0, 1) | -α |
| (1, 0, 0) | -β |
| (0, 0, 1) | -β |
| (0, 0, 0) | -γ |

Note that the modulation index estimate 321 $\tilde{h}_n$ is close to the transmitted modulation index h if there is no distortion in a channel and no significant noise added. By averaging the modulation index estimate 321 $\tilde{h}_n$ over samples, an accurate modulation index estimate 331 $\hat{h}$ can be obtained even with significant noise. After obtaining the modulation index estimate 331 $\hat{h}$, the instant noise power 341 $p_n^w$ may be estimated using $$p_n^w = (r_n - \delta_n \hat{h})^2$$

Again, by averaging instant noise power 341 $p_n^w$ over samples, an accurate noise power estimate 361 $p_n$ can be obtained. A receive power estimate 371 $p_r$ can be calculated by averaging $|r_n|^2$ 351 over samples. Therefore, a signal quality 381 $Q_0$ which well relates to the BER of the plurality of decoded bits 302 at the Rx can be estimated as following:

$$Q_0 = (p_r - p_n)/p_n.$$

Note that the plurality of values ±1/α, ±1/β and ±1/γ 311, are pre-calibrated with the reference Rx by measurements, computer simulations and calculations.

Figure 2:
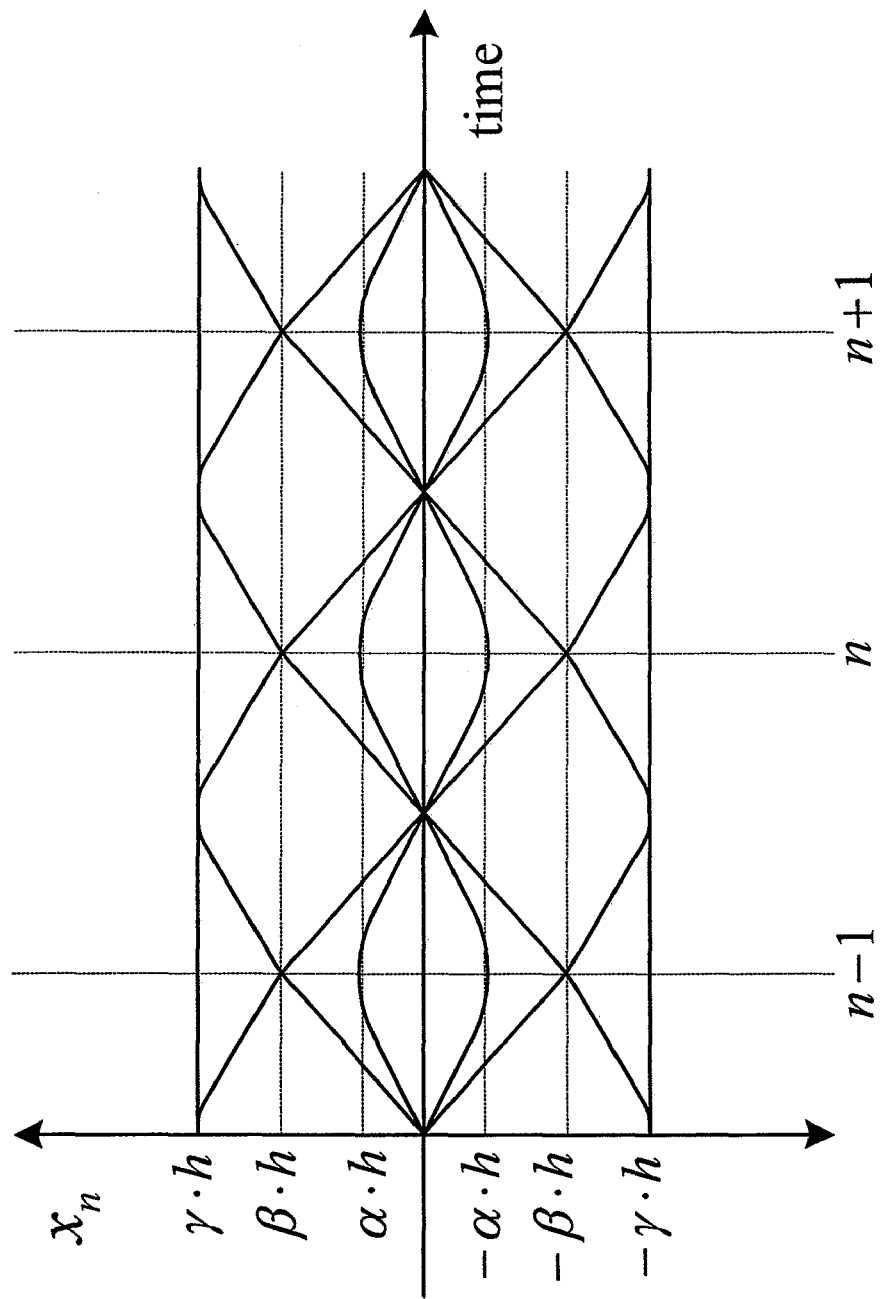
FIG. 2 shows a typical trellis of the received frequency for a GFSK signal according to the present invention.
Figure 4:
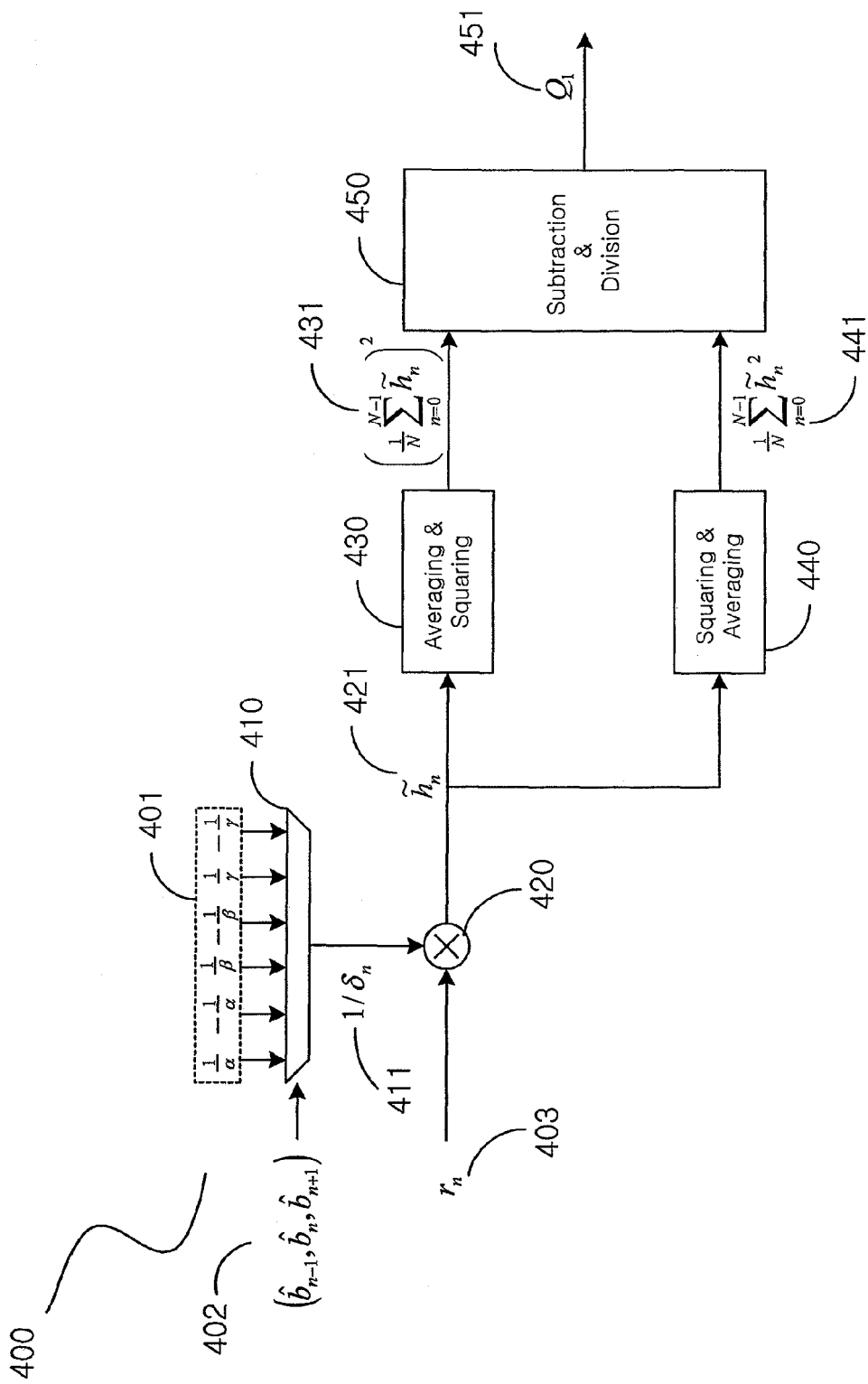
FIG. 4 shows another example of signal quality measurement implementation according to the present invention.

Refereeing to FIG. 4, an algorithm of a method for signal quality measurement 400 comprises a plurality of decoded bits 402 and a subtraction and division unit 450. The plurality of decoded bits 402 is used for normalizing a frequency deviation information 403 to obtain a quite constant value as a modulation index estimate 421 by comparing with a plurality of pre-calibrated trellis 401. The subtraction and division unit 450 is used for calculating a signal quality 451 by averaging and squaring the modulation index estimate 421. The method is to calculate the variance of the normalized frequency deviation information. The frequency deviation information 403 $r_n$ fluctuates with the plurality of decoded bits 402 [$\hat{b}_{n-1}, \hat{b}_n, \hat{b}_{n+1}$] as shown in FIG. 1 and FIG. 2. The frequency deviation information 403 can be normalized with the plurality of decoded bits 402 [$\hat{b}_{n-1}, \hat{b}_n, \hat{b}_{n+1}$] and the plurality of pre-calibrated trellis 401. Then, normalized frequency deviation information shall have a quite constant value as a modulation index estimate 421 without significant distortion or noise. By measuring the variance of the normalized frequency deviation information, we can measure the amount of the distortion or noise. It means that the signal quality measurement 400 comprising the steps of: using a plurality of decoded bits 402 to normalize a frequency deviation information 403 for obtaining a quite constant value as a modulation index estimate 421 by comparing with a plurality of pre-calibrated trellis 401; and using a subtraction and division unit 450 to calculate a signal quality 451 by averaging and squaring the modulation index estimate 421.

In addition, many alternatives for the signal quality estimation 400, based on the trellis of the frequency deviation information 403, exist. For example, refereeing to FIG. 4, the following signal quality 451 $Q_1$ estimated by measuring the variance of the normalized frequency deviation information:

step 1: pre-calibrating with a reference Rx to obtain a plurality of values $1/\alpha$, $1/\beta$ and $1/\gamma$ 401 according to a plurality of decoded bits 402 [$\hat{b}_{n-1}, \hat{b}_n, \hat{b}_{n+1}$];

Step 2: obtaining the plurality of decoded bits 402 [$\hat{b}_{n-1}, \hat{b}_n, \hat{b}_{n+1}$] from a decoder 130 of the reference Rx;

Step 3: selecting a value 411 $1/\delta_n$ in a multiplexer 410 among the plurality of values $\pm 1/\alpha$, $\pm 1/\beta$ and $\pm 1/\gamma$ 401, according to the plurality of decoded bits 402 [$\hat{b}_{n-1}, \hat{b}_n, \hat{b}_{n+1}$] and Table 2;

Step 4: obtaining a frequency deviation information 403 $r_n$ from a frequency discriminator 120 of the reference Rx;

Step 5: multiplying the frequency deviation information 403 $r_n$ by the value 411 $1/\delta_n$ in a multiplier 420 to generate a quite constant value as a modulation index estimate 421 $\tilde{h}_n$;

Step 6: averaging the modulation index estimate 421 $\tilde{h}_n$ over samples and squaring 430 it to obtain $$\left(\frac{1}{N}\sum_{n=0}^{N-1}\tilde{h}_n\right)^2 431;$$

Step 7: squaring the modulation index estimate 421 $\tilde{h}_n$ and averaging it over samples to obtain $$\frac{1}{N}\sum_{n=0}^{N-1}\tilde{h}_n^2 \; 441;$$

Step 8: estimating a signal quality 451 $Q_1$ by $$Q_1 = \frac{\left(\frac{1}{N}\sum_{n=0}^{N-1}\tilde{h}_n\right)^2}{\frac{1}{N}\sum_{n=0}^{N-1}\tilde{h}_n^2 - \left(\frac{1}{N}\sum_{n=0}^{N-1}\tilde{h}_n\right)^2}.$$

Additionally, the plurality of pre-calibrated trellis 401 are pre-calibrated by measurements, computer simulations and/or calculations. The plurality of pre-calibrated trellis 401 are also related to the plurality of decoded bits 402 and the plurality of binary information bits 101. The modulation index estimate 421 $\tilde{h}_n$ is calculated as previous (Step 1~5). The modulation index estimate 421 $\tilde{h}_n$ can be also considered as a normalized frequency deviation value. Then, the modulation index estimate 421 $\tilde{h}_n$ is averaged over samples and squared in the unit 430 to generate.

$$\left(\frac{1}{N}\sum_{n=0}^{N-1}\tilde{h}_n\right)^2 431.$$

In the meantime, the modulation index estimate 421 $\tilde{h}_n$ is squared and averaged over samples in the unit 440 to generate $$\frac{1}{N}\sum_{n=0}^{N-1}\tilde{h}_n^2 \; 441.$$

Finally, the signal quality 451 $Q_1$ is calculated in a subtraction and division unit 450 by utilizing $$\left(\frac{1}{N}\sum_{n=0}^{N-1}\tilde{h}_n\right)^2 431 \text{ and } \frac{1}{N}\sum_{n=0}^{N-1}\tilde{h}_n^2 \; 441.$$

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An apparatus for signal quality measurement on GFSK signals, comprising:
    a plurality of binary information bits, modulated and sent with an analog output to a channel;
    a received RF signal, processed through a Rx RF unit combined with a filter to obtain a filtered value, being from the channel;
    a frequency discriminator, used for extracting a frequency deviation information from the filtered value;
    a decoder, used for sampling the frequency deviation information at the correct timing to decode and generate a plurality of decoded bits; and
    a signal quality measurement unit, used for measuring a signal quality of the plurality of decoded bits, being a pre-calibrated measurement,
    wherein the signal quality measurement unit comprises:
    a frequency deviation information, used for measuring a receive power and a noise power;

a plurality of decoded bits, used for measuring the noise power on the current frequency deviation information by comparing with a plurality of pre-calibrated trellis;

a plurality of averaging over samples units, used for making the receive power and the noise power become accurate and reliable; and a subtraction and division unit, used for calculating a ratio of the receive power and the noise power as a quality indicator to obtain a signal quality.

2. The apparatus for signal quality measurement on GFSK signals as claimed in claim 1, wherein the channel can be either an air channel or a cable channel.

3. The apparatus for signal quality measurement on GFSK signals as claimed in claim 1, wherein the plurality of pre-calibrated trellis are pre-calibrated by measurements, computer simulations and /or calculations.

4. The apparatus for signal quality measurement on GFSK signals as claimed in claim 1, wherein the plurality of pre-calibrated trellis are related to the plurality of decoded bits and a plurality of binary information bits.

5. An apparatus for signal quality measurement on GFSK signals, comprising:

a plurality of binary information bits, modulated and sent with an analog output to a Channel;

a received RF signal, processed through a Rx RF unit combined with a filter to obtain a filtered value, being from the channel;

a frequency discriminator, used for extracting a frequency deviation information from the filtered value;

a decoder, used for sampling the frequency deviation information at the correct timing to decode and generate a plurality of decoded bits; and a signal quality measurement unit, used for measuring a signal quality of the plurality of decoded bits, being a pre-calibrated measurement, wherein the signal quality measurement unit comprises:

a plurality of decoded bits, used for normalizing a frequency deviation information to obtain a quite constant value as a modulation index estimate by comparing with a plurality of pre-calibrated trellis; and a subtraction and division unit, used for calculating a signal quality by averaging and squaring the modulation index estimate.

6. The apparatus for signal quality measurement on GFSK signals as claimed in claim 5, wherein the plurality of pre-calibrated trellis are pre-calibrated by measurements, computer simulations and/or calculations.

7. The apparatus for signal quality measurement on GFSK signals as claimed in claim 5, wherein the plurality of pre-calibrated trellis are related to the plurality of decoded bits and a plurality of binary information bits.

8. A method for signal quality measurement on GFSK signals, comprising the steps of:

modulating and sending a plurality of binary information bits with an analog output to a channel;

processing a received RF signal from the channel through a Rx RF unit combined with a filter to obtain a filtered value;

using a frequency discriminator to extract a frequency deviation information from the filtered value;

using a decoder to sample the frequency deviation information at the correct timing to decode and to generate a plurality of decoded bits; and using a signal quality measurement as a pre-calibrated measurement to measure a signal quality of the plurality of decoded bits, wherein the signal quality measurement comprising the steps of:

using a frequency deviation information to measure a receive power and a noise power;

using a plurality of decoded bits to measure the noise power on the current frequency deviation information by comparing with a plurality of pre-calibrated trellis;

making the receive power and the noise power become accurate and reliable by using a plurality of averaging over samples units; and calculating a ratio of the receive power and the noise power as a quality indicator to obtain a signal quality by using a subtraction and division unit.

9. The method for signal quality measurement on GFSK signals as claimed in claim 8, wherein the channel can be either an air channel or a cable channel.

10. The method for signal quality measurement on GFSK signals as claimed in claim 8, wherein the plurality of pre-calibrated trellis are pre-calibrated by measurements, computer simulations and /or calculations.

11. The method for signal quality measurement on GFSK signals as claimed in claim 8, wherein the plurality of pre-calibrated trellis are related to the plurality of decoded bits and a plurality of binary information bits.

12. A method for signal quality measurement on GFSK signals, comprising the steps of:

modulating and sending a plurality of binary information bits with an analog output to a channel;

processing a received RF signal from the channel through a Rx RF unit combined with a filter to obtain a filtered value;

using a frequency discriminator to extract a frequency deviation information from the filtered value;

using a decoder to sample the frequency deviation information at the correct timing to decode and to generate a plurality of decoded bits; and using a signal quality measurement as a pre-calibrated measurement to measure a signal quality of the plurality of decoded bits, wherein the signal quality measurement comprising the steps of:

using a plurality of decoded bits to normalize a frequency deviation information for obtaining a quite constant value as a modulation index estimate by comparing with a plurality of pre-calibrated trellis; and using a subtraction and division unit to calculate a signal quality by averaging and squaring the modulation index estimate.

13. The method for signal quality measurement on GFSK signals as claimed in claim 12, wherein the plurality of pre-calibrated trellis are pre-calibrated by measurements, computer simulations and /or calculations.

* * * * *